United States Patent [19]

Dantan

[11] Patent Number: 4,743,055
[45] Date of Patent: May 10, 1988

[54] AUTOMATIC GRIPPER FOR GRIPPING AND HOLDING A ROD, ESPECIALLY ON A DRILLING RIG

[75] Inventor: Olivier Dantan, Paris, France

[73] Assignee: Brissonneau et Lotz Marine, Carquefou-Nantes, France

[21] Appl. No.: 886,023

[22] Filed: Jul. 15, 1986

[30] Foreign Application Priority Data

Jul. 19, 1985 [FR] France ............... 85 11060

[51] Int. Cl.$^4$ .................. B66C 1/42; E21B 19/06
[52] U.S. Cl. ....................... 294/88; 294/110.1; 294/113; 294/119.4
[58] Field of Search .............. 294/86.4, 86.41, 88, 294/90, 110.1, 113–115, 119.4; 414/22, 23, 732, 733, 739, 745

[56] References Cited

U.S. PATENT DOCUMENTS

| | | | |
|---|---|---|---|
| 637,594 | 11/1899 | Hett | 294/110.1 |
| 2,692,059 | 10/1954 | Bolling | 294/110.1 X |
| 3,112,038 | 11/1963 | Breivik | 294/113 X |
| 3,522,966 | 8/1970 | Wood | 294/113 X |
| 4,650,235 | 3/1987 | Shaginian et al. | 294/113 X |

FOREIGN PATENT DOCUMENTS

| | | | |
|---|---|---|---|
| 35474 | 8/1922 | Norway | 294/114 |
| 434052 | 10/1974 | U.S.S.R. | 294/90 |
| 440323 | 1/1975 | U.S.S.R. | 294/90 |
| 549400 | 4/1977 | U.S.S.R. | 294/110.1 |

*Primary Examiner*—Johnny D. Cherry
*Attorney, Agent, or Firm*—Rines and Rines, Shapiro and Shapiro

[57] ABSTRACT

An automatic gripper, useful especially for gripping and holding drilling rods on a drilling rig, has a chassis with a front end in the form of a fork equipped with retractable jaws (50). The jaws are retracted by pushing contact with a drilling rod (40) when the rod enters the fork, whereupon a return mechanism (72) automatically restores the jaws to a closed position. The chassis is held fixed on a horizontal pivot axis by rupturable pins or the like. The pins rupture to permit the chassis to pivot when subjected to a predetermined torque, with friction members being provided to frictionally limit the pivotal movement of the chassis. The gripper is thus protected against damage from impacts with the rod lifting mechanism of the drilling rig, for example.

25 Claims, 1 Drawing Sheet

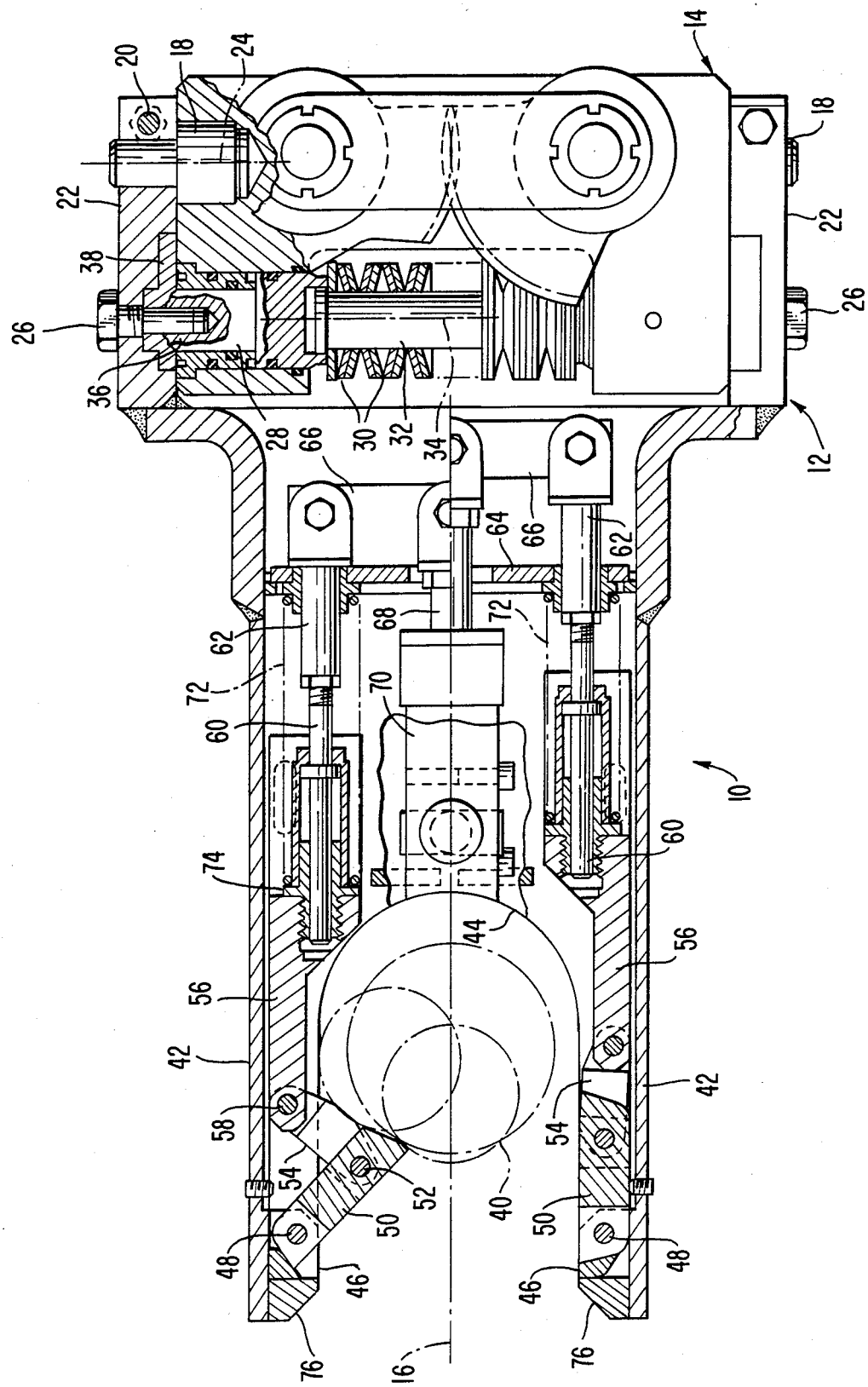

AUTOMATIC GRIPPER FOR GRIPPING AND HOLDING A ROD, ESPECIALLY ON A DRILLING RIG

This invention concerns an automatic gripper for gripping and holding a rod and useful especially on a drilling rig when moving the drilling rods between the storage racks provided on the rig and the vertical axis of the well.

As is known, when drilling a well in the ground, particularly an oil well, a train of rods of great length is lowered into the well and at its bottom end it carries an excavation tool that must be changed frequently. To do this, it is necessary to raise the train of rods and take it out of the well, and then to lower it into the well after changing the tool. The drilling rods screwed end to end to make up the train of rods are unscrewed one by one or in lengths of three rods when the train of rods is removed from the well, and are stored vertically in the racks provided on the drilling rig. Up to this time, these operations of moving an assembly of three rods lifted from the well and disassembled from the train of rods remaining in the well have been carried out by hand, with the assembly of rods remaining suspended by lift devices when it is moved from the axis of the drill shaft to the storage rack and vice versa. Since these operations are very laborious and dangerous, it is desirable to mechanize them and automate them to the greatest possible extent.

To this end, this invention proposes an automatic gripper for gripping and holding a rod, suitable for being used on the drilling rig when an assembly of rods screwed end to end is removed from the well and disassembled from the train of rods remaining in the well for placement in the storage racks.

The automatic gripper pursuant to the invention, comprises a chassis and clamps mounted to pivot on the chassis and is characterized by the fact that the chassis has at its front end a U-shaped fork suitable for engaging with clearance on the rod, and whose two parallel branches carry the aforementioned clamps, which are of the type that open automatically when striking the rod when this enters the fork, and automatically return to the closed position.

Accordingly, it is sufficient to engage this gripper on a rod while moving it perpendicularly to the axis of the rod, so that the rod can enter the U-shaped fork while pushing back the aforementioned clamps, which then return to the closed position. The rod is then held by the gripper and can be moved by it.

In accordance with other characteristics of the invention, the clamps of the gripper on each branch of the fork have a bar mounted to rotate around an axis perpendicular to the plane of the U and movable around this axis between an open position in which the bar extends along the branch of the fork and a closed position in which it extends diagonally relative to the aforesaid branch, elastic means of return constantly urging the aforesaid bar towards its closed position, and means such as a hydraulic or pneumatic jack provided on the chassis for moving these bars to their open position opposite to the action of the means of return.

Accordingly, it is only necessary to power this jack to move the bars from their closed position into their open position, which permits releasing the rod at the desired moment and disengaging the gripper by simply moving in a direction perpendicular to the axis of the rod.

Pursuant to another characteristic of the invention, the rear end of the chassis of the gripper is mounted to rotate around a transverse axis on a supporting part. The chassis is connected to the supporting part by means preventing its rotation around the aforementioned axis when the torque applied to the chassis stays below a predetermined value.

In accordance with one mode of embodiment of the invention, the aforementioned rotation preventing means consist of rupture pins parallel to the aforementioned transverse axis and screwed through the walls of the chassis into pistons that are mounted to slide in holes across the supporting part, and which are acted on by springs resting against the corresponding walls of the chassis.

During the activities of raising and lowering a train of rods or an assembly of rods, there is a danger that the lifting means on which the train of rods or the assembly of rods is suspended can run into the gripper if the gripper has not been disengaged in time. The result is a risk of the gripper being torn out and resulting destruction of the gripper and of its means of support and motion. This danger is avoided by the arrangement pursuant to the invention. In particular the impact of the means of lifting at the end of the gripper causes the rupture of the aforementioned pins and rotation of the chassis around the transverse axis on the supporting part. In addition, since the pistons are loaded by springs, their heads press against the side walls of the chassis, from which there is great friction which holds the chassis of the gripper in an inclined position relative to the horizontal. The strength of the pins is naturally determined so that their rupture occurs before the means of support and motion of the gripper can themselves be damaged by the impact.

In the description that follows, given by way of example, reference is made to the attached schematic drawing, which is a view in longitudinal horizontal cross section of the gripper pursuant to the invention.

This gripper has a chassis 10 having a rear end 12 in the form of a cap mounted on a supporting part 14 that can move horizontally along the axis 16 of the chassis 10, by appropriate means.

This supporting part 14 has two horizontal shafts 18 aligned transversely and held in notches 20 of the rear vertical edges of the side walls 22 of the cap 12 on a transverse horizontal axis 24 of rotation of the chassis 10 relative to the supporting part 14.

The chassis 10 is immobilized from rotation on the supporting part 14 by means of two pins 26 in transverse alignment that pass through holes in the side walls 22 of the cap 12. Pins 26 are screwed into pistons 28 in transverse alignment, lodged in horizontal holes in transverse alignment in the supporting part 14. The bases of the two pistons 28 face toward one another and a set of spring washers 30 is strung on a transverse guide rod 32 and is interposed between the bases of the two pistons 28. These spring washers 30 thus constitute a compression spring developing great force and pushing the two pistons 28 away from one another along a horizontal transverse axis 34 parallel to the axis of rotation 24 and located in front of it.

The heads of the piston 28 have a convex shape, for example the shape of a spherical segment, and are received in cavities 36 of corresponding shape formed in the plates 38 lining the internal faces of the side walls 22 of the cap and attached to them by screws. The rods of the pins 26 are screwed through plates 38 into the axial holes in the heads of the pistons 28.

These pins 26 are made of a pure rupturing material, for example bronze, while the plates 38 are made of a very hard material resistant to the friction of the heads of the pistons 28.

The front part of the chassis 10 of the gripper forms a U-shaped fork suitable for engaging a drilling rod 40 whose contour has been represented in broken lines on the drawing and which has a vertical axis, i.e., an axis perpendicular to the plane of the drawing.

This fork provided at the front end of the chassis 10 of the gripper is formed by two vertical walls 42 of the chassis 10 which extend parallel to the aforementioned axis 16 and that are linked together opposite their free ends by a semicylindrical wall 44 of concave shape having a diameter greater than the outside diameter of the widest section of a drilling rod. Each longitudinal wall 42 of the chassis of the gripper has a U-shape in transverse section and has upper and lower horizontal flanges 46 turned toward one another, on which are fastened vertical pivoting shafts 48 for the ends of two bars 50 whose opposite ends are mounted to pivot around vertical axes 52 at the ends of two other bars 54 forming links between the bars 50 and sliders 56 guided in motion along internal faces of the longitudinal walls 42 of the chassis 10. The front ends of the sliders 56 are linked to pivot around vertical axes 58 at the other ends of the links 54, and their rear ends are integral with horizontal rods 60 parallel to the axis 16 of the chassis. The rear ends of the two rods 60 are extended by horizontal rods 62 guided in motion in holes in a fixed transverse plate 64 of the chassis 10. The rear ends of rods 62 are linked to one another by a transverse bar 66 movable relative to the chassis 10. The middle section of this transverse bar 66 is fastened to the end of a piston rod 68 of a horizontal jack 70 whose body is fastened to the chassis 10 and extends along longitudinal axis 16.

Compression springs 72 surround the rods 60 and their extension rods 62 and press on their ends, on the one hand against a shoulder 74 of the sliders 56, and on the other hand against the fixed transverse plate 64 traversed by the extension rods 62.

The springs 72 constantly push the sliders 56 toward the front into the position shown in the top half of the drawing. In this position, each bar 50 and its link 54 form a V whose peak projects between the two longitudinal walls 42 of the chassis and opposes the free passage of a drilling rod.

When the jack 70 is powered with pressurized fluid, its piston rod 68 is displaced toward the rear and, by the cooperation of the transverse bar 66 and rods 60 and 62, urges the sliders 56 into the position shown in the bottom half of the drawing. In this position, each bar 50 and its link 54 are parallel to the longitudinal walls 42 of the chassis. When the jack 70 is released, the springs 72 automatically urge the sliders 56 toward the front and the links 54 urge the bars 50 to extend between the longitudinal walls 42 of the chassis. In this position, the distance between the ends of the bars 50 is less than the outside diameter of the narrowest section of a drilling rod.

This position of the bars is defined by contact of their front ends with thrust parts 76 fastened to the front ends of the longitudinal walls 42 of the chassis.

The operation of this gripper is as follows:

The jack 70 is released so that the two sliders 56 are pushed toward the front of the springs 72 to bring the bars 50 into an angled position relative to the longitudinal walls 42 of the chassis of the gripper.

When the gripper is then engaged by a vertical drilling rod, as by being displaced horizontally along its axis 16 perpendicular to the axis of the drilling rod, the rod engages the bars 50 and pushes them toward the longitudinal walls 42 of the chassis, overcoming the force developed by the springs 72. When the drilling rod has moved sufficiently toward the semicylindrical wall 44 forming the bottom of the fork, and when it has passed the rear ends of the bars 50, bars are returned to their angled position by the springs 72 acting on the sliders 56.

The drilling rod is then held inside the gripper between the longitudinal walls 42 of the chassis 10, the semicylindrical wall 44, and the rear ends of the bars 50.

However, the drilling rod then pushes on the end of one or both bars 50, for example when the gripper is moved toward the rear, it cannot cause the retraction of these bars i.e., pivoting of the bars along the longitudinal walls 42 of the chassis. Instead, to release the drilling rod, it is necessary to power the jack 70 with pressurized fluid so that the sliders 56 are moved toward the rear of the chassis.

As indicated above, should the lifting means on which the drilling rod is suspended accidentally run into the front end of the chassis of the gripper, the chassis can pivot around the horizontal transverse axis 24 if the torque applied to it at its front end is sufficient to cause rupture of the pins 26. Under these conditions, the chassis 10 pivots around the axis 24 by a certain angular amount, and its pivoting motion is stopped by the heads of pistons 28, which are pushed very strongly by the spring washers 30 against the flat faces of the aforementioned plates 38.

The gripper pursuant to the invention accordingly permits gripping and holding automatically a drilling rod without the necessity of doing anything more than moving the gripper to engage its front end with the drilling rod.

The release of the rod by the gripper is also carried out very simply by powering a jack with fluidized pressure.

The special mounting of the rear end of the chassis of the gripper on the supporting part avoids any risk of serious accident and substantial destruction of equipment.

I claim:

1. A gripper for gripping and holding a rod, such as a drilling rod on an oil well drilling rig, transversely to the rod axis, comprising:

a chassis mounted on a movable support and carrying means for gripping the rod in a plane transverse to the rod axis, said chassis being connected to said support by a first connection pivotal on a pivot axis substantially parallel to said plane and by a rupturable second connection which locks said chassis against pivotal movement on said pivot axis, said rupturable connection including pin means rupturable upon being subjected to a predetermined torque applied to said chassis about said pivot axis such that said chassis may then pivot on said pivot axis, friction means mounted to said support and frictionally engaging a surface of said chassis, and means mounted to said support and urging said friction means against said surface of said chassis to frictionally limit pivotal movement of said chassis on said pivot axis upon rupture of said pin means.

2. A gripper according to claim 1, wherein said friction means includes a pair of pistons engaging said chassis at opposite sides of said support and wherein said urging means includes spring means urging said pistons against said chassis.

3. A gripper according to claim 2, wherein said pin means includes two rupturable pins each having a shaft received in a respective one of said pistons.

4. A gripper according to claim 2, wherein said friction means includes a pair of axially aligned pistons mounted in transverse holes at opposite sides of said support and wherein said urging means includes spring means disposed intermediate said pistons and urging said pistons oppositely outward of said support.

5. A gripper according to claim 4, wherein said pistons have spherical segment heads engaged with complementary surfaces of respective friction plates mounted to said chassis.

6. In an oil well drilling rig of the type having a lifting means for raising and lowering drilling rods out of and into the well, a gripper for gripping the drilling rods for delivery to and from the lifting means, said gripper comprising:

a chassis mounted on a horizontally movable support for horizontal movement to engage and disengage a drilling rod suspended substantially vertically from the lifting means, said chassis including at a front end thereof an open horizontal U-shaped fork dimensioned to receive the substantially vertical drilling rod with clearance and having a pair of spaced legs carrying opposed jaws mounted for movement between a normal closed position in which the jaws obstruct passage of the drilling rod into and out of said fork and a non-obstructing open position, said jaws being mounted to said legs by mounting means yielding to allow said jaws to be pushed open by the drilling rod during passage of the rod into said fork, biasing means resiliently biasing said jaws to said closed position such that said jaws reclose after they have been pushed open and the drilling rod received, means preventing said jaws from opening in response to an outward force on said jaws by the received drilling rod to avoid unintended release of the rod from the gripper, and automatic means operable for opening said jaws to release the received drilling rod.

7. A gripper according to claim 6, wherein each said jaw comprises a collapsible V-shaped linkage including a first link member and a second link member having respective first ends pivotally connected to one another intermediate respective second ends thereof, and wherein said mounting means includes means pivotally connecting the second end of said first link member to the corresponding leg of said fork and means pivotally connecting the second end of said second link member to a slide member slidable longitudinally of said corresponding leg, the aforesaid pivotal connections being on parallel axes transverse to the plane of said fork, said link members and said slide member being arranged such that when in said closed position said linkage collapses with attendant longitudinal sliding of said slide member in response to a pushing force into said fork by said rod so that said jaw may be pushed open.

8. A gripper according to claim 7, wherein said biasing means includes resilient means biasing each slide member longitudinally of said fork.

9. A gripper according to claim 8, wherein said biasing means comprises a pair of springs each biasing a respective said slide member longitudinally of the corresponding leg of said fork.

10. A gripper according to claim 7, wherein said automatic opening means comprises a hydraulic jack mounted to said chassis and means coupling said jack to the respective slide members, said jack operating to displace the respective slide members longitudinally of said fork to collapse the respective jaws to said open position.

11. A gripper according to claim 6, wherein said chassis is pivotally connected to said support on a first horizontal axis, said gripper further including pin means connecting said chassis to said support on a second horizontal axis and thereby locking said chassis relative to said support on said first horizontal axis, said pin means being rupturable upon being subjected to a predetermined torque applied to said chassis about said first horizontal axis, friction means mounted to said support and frictionally engaging a surface of said chassis, and urging means mounted to said support and urging said friction means against said surface of said chassis to frictionally limit pivotal movement of said chassis on said first horizontal axis upon rupture of said pin means.

12. A gripper according to claim 11, wherein said friction means includes a pair of pistons frictionally engaging said chassis at opposite sides of said support and wherein said urging means includes spring means urging said pistons against said chassis.

13. A gripper according to claim 12, wherein said pin means includes two rupturable pins each connecting said chassis to said support and having a shaft received in a respective one of said pistons.

14. A gripper according to claim 11, wherein said friction means includes a pair of axially aligned pistons mounted in transverse holes at opposite sides of said support and wherein said urging means includes spring means disposed intermediate said pistons and urging said pistons oppositely outward of said support frictionally against corresponding surfaces of said chassis.

15. A gripper according to claim 14, wherein said pistons have spherical segment heads frictionally engaged with complementary surfaces of respective plates mounted to said chassis.

16. An automatic gripper for gripping and holding a rod, such as a drilling rod on an oil well drilling rig, transversely of the rod axis, said gripper comprising:

a chassis including at a front end thereof an open U-shaped fork dimensioned to receive the rod transversely of the rod axis and with clearance, said fork having a pair of spaced legs carrying opposed jaws mounted for movement laterally of said fork between a normal closed position in which the jaws obstruct passage of the rod into and out of said fork and a nonobstructing open position, said jaws being mounted to said legs by mounting means yielding to allow said jaws to be pushed open by the rod during passage of the rod into said fork, biasing means resiliently biasing said jaws to said closed position such that said jaws reclose after they have been pushed open and the rod received, means preventing said jaws from opening in response to an outward force on said jaws by the received rod to avoid unintended release of the rod from the gripper, and wherein each said jaw comprises a collapsible V-shaped linkage including a first link member and a second link member having respective first ends pivotally connected to one another intermediate respective second ends thereof, and wherein said mounting means includes means pivotally connecting the second end of said first link member to the corresponding leg of said fork and means pivotally connecting the second end of said second link member to a slide member slidable longitudinally of said corresponding leg, the aforesaid pivotal connections all being on parallel axes transverse to the plane of said fork, said link members and said slide member being arranged such that when in said closed position said linkage collapses with attendant longitudinal sliding of said slide member in response to a pushing force into said fork by the rod so that said jaw may be pushed open.

17. A gripper according to claim 16, wherein said biasing means urges the slide member of each jaw toward the second end of the first link member of that jaw.

18. A gripper according to claim 17, wherein said biasing means comprises a pair of springs each urging a respective one of said slide members as aforesaid.

19. A gripper according to claim 16, including automatic means carried by said chassis for collapsing said jaws to said open position to release a received rod from said fork.

20. A gripper according to claim 19, wherein said automatic means comprises a hydraulic jack connected to the respective slide members and operable to displace said slide members to open said jaws.

21. A gripper according to claim 20, wherein said jack has a piston connected to a transverse bar displaceable longitudinally of said fork and having opposite ends connected to the slide members, respectively.

22. A gripper according to claim 21, wherein said opposite ends of said transverse bar are connected to the slide members by respective connecting rods.

23. A gripper according to claim 22, wherein said biasing means comprises a pair of springs each urging a respective one of said jaws closed, each spring being mounted between a shoulder of the corresponding connecting rod and a fixed stop of said chassis.

24. A gripper according to claim 16, wherein said chassis is pivotally connected to a support on a first axis in the plane of said fork, said gripper further including pin means connecting said chassis to said support on a second axis substantially parallel to said first axis and thereby locking said chassis relative to said support on said first axis, said pin means being rupturable upon being subjected to a predetermined torque applied to said chassis about said first axis, friction means mounted to said support and frictionally engaging a surface of said chassis, and urging means mounted to said support and urging said friction means against said surface of said chassis to frictionally limit pivotal movement of said chassis on said first axis upon rupture of said pin means.

25. A gripper according to claim 24, wherein said friction means includes a pair of pistons frictionally engaging said chassis at opposite sides of said support and wherein said urging means includes spring means urging said pistons against said chassis.

* * * * *